March 26, 1929.　　C. A. ADAMS　　1,706,723
TOOL FOR LENS GRINDING APPARATUS
Filed Aug. 2, 1926
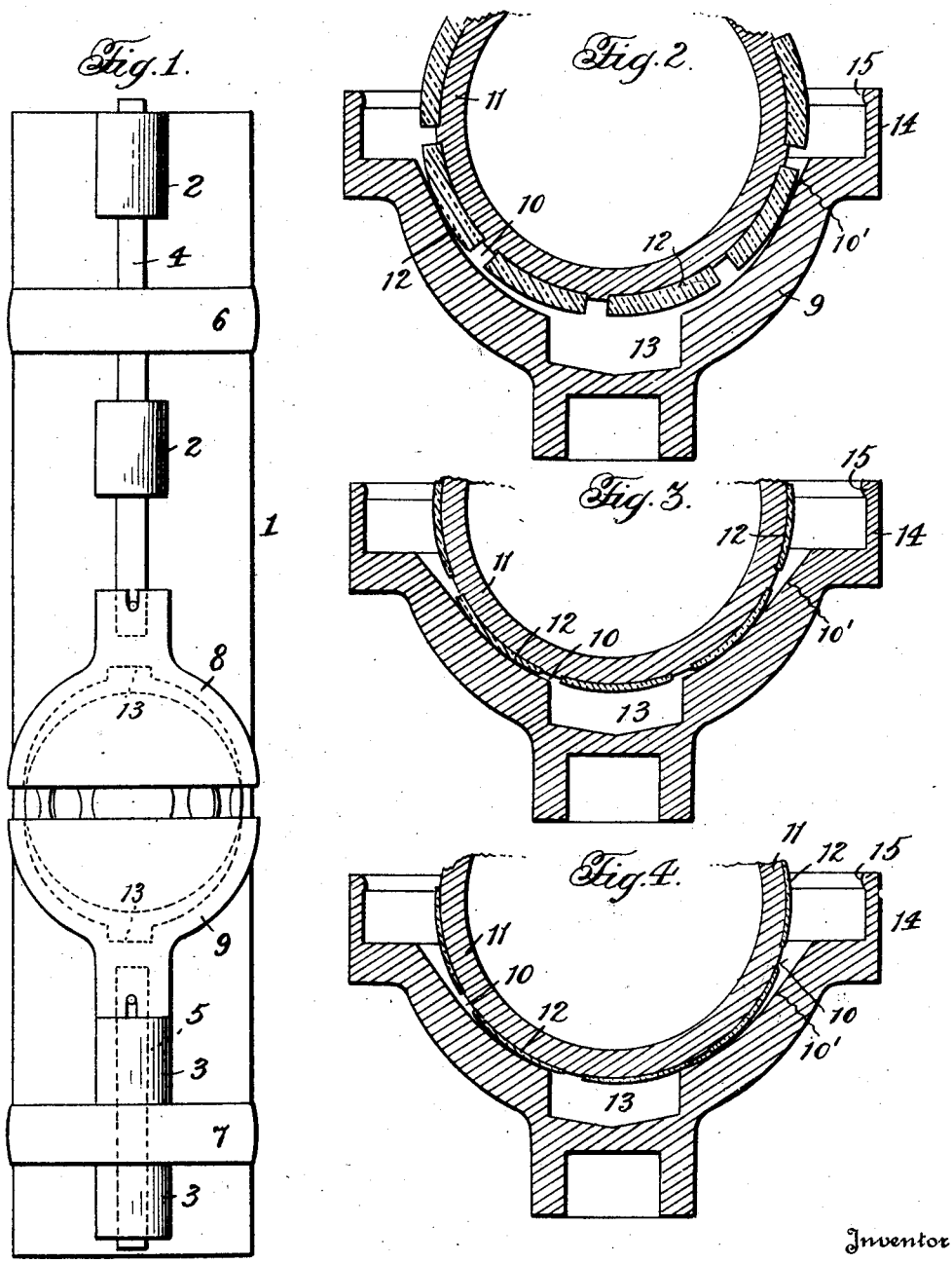

Patented Mar. 26, 1929.

1,706,723

UNITED STATES PATENT OFFICE.

CHARLES A. ADAMS, OF DAVENPORT, IOWA.

TOOL FOR LENS-GRINDING APPARATUS.

Application filed August 2, 1926. Serial No. 126,653.

My invention relates to new and useful improvements in grinding apparatus and more particularly to a tool for lens grinders, the principal object of the invention residing in the provision of a tool having a concaved depression therein and a recess formed centrally of the depression.

A further object of the invention resides in the formation of the lowermost tool with an upwardly extending annular flange providing a hopper into which the abrasive material is fed.

With the above and other objects in view, which will appear as the description proceeds, my invention consists in the novel details of construction, and arrangement of parts, described in the following specification and illustrated in the accompanying drawings, and while I have illustrated and described the preferred embodiments of the invention, as they now appear to me, it will be understood that such changes may be made as will fall within the scope of the appended claim.

In the drawings:

Fig. 1 is a front elevation.

Fig. 2 is a transverse vertical section through the lowermost tool with the blocker in its initial position.

Figs. 3 and 4 are views similar to Fig. 2 showing different positions of the blocker during the lens grinding operation.

In the drawings 1 indicates a support for the bearings 2 and 3, a rotatable shaft 4 being mounted in the bearings 2 and the rotatable shaft 5 in the bearings 3. A driving pulley 6 in carried by the shaft 4 and the similar pulley 7 is carried by the shaft 5.

Detachably connected to the lower end of the shaft 4 is the upper grinding tool 8 and detachably connected to the upper end of the shaft 5 is the lower grinding tool 9. Normally the grinding tools are vertically spaced as shown more particularly in Fig. 1 and each of the tools is formed with the concaved depression 10 and receive therebetween the spherical blocker 11 on which the lenses 12 to be ground are spotted. The upper edges of the depressions 10 are beveled as shown at 10' for the purpose which will be later described.

Centrally of each of the concaved depressions 10, of each of the tools 8 and 9, is formed a central recess 13, said recesses allowing the blocker to carry the lenses into the recesses in such a manner that at all times during the grinding operation there will be a large bearing or grinding surface. The formation of the recesses to allow for the above mentioned large bearing surfaces eliminates the necessity of machining out the tools to the required curve.

The lowermost tool 9 is provided with the upwardly extending annular flange 14 having at the top the inwardly extending bead or projection 15. The upwardly extending flange 14 forms a hopper to receive the abrasive material.

In my copending application Serial No. 683,694 I have shown a grinding tool with a concaved depression but I have found in the use of tools of the character shown in that application that as the lenses are ground to the desired size the blocker plus the thickness of the lenses becomes smaller than the curve in the tools and thereby causes the blocker, with the lenses, to bear on a small surface in the bottom of the depressions. This results in an uneven grinding of the lenses and often chipping or breaking of the edges thereof. By providing the central recesses 13, in my present improvements, as the grinding of the lenses proceeds and the diameter of the blocker, plus the lenses, are reduced the blocker carrying the lenses sinks further into the depressions of the tools.

With the present improvements the lenses to be ground are spotted upon the blocker 11 as is quite clearly illustrated in the drawings, and the blocker with the lenses thereon is positioned between the grinding tools 8 and 9 as more particularly illustrated in Fig. 1 of the drawings. The position of the blocker, with the lenses carried thereby, relative to each of the tools 8 and 9, will be the same and I have illustrated the position of the blocker, with its lenses, in Figs. 2, 3 and 4 of the drawings, relative to the lower tool. When the blocker is initially positioned between the tools the lenses to be ground will bear upon the surface of the tool as illustrated in Fig. 2 at a point towards the outer edge of the tool. As the grinding proceeds and the diameter of the blocker, plus the lenses, is reduced the blocker sinks further into the depressions of the tools to the positions disclosed in Figs. 3 and 4. In Fig. 2 the lenses are shown as bearing at a point spaced from the edge of the circular recess whereas in Fig. 4 the lenses as shown are bearing at the surface adjacent the edge of the recess. It can be readily seen that without the recess 13 the blockers could not sink to allow the grinding of the lenses as shown. In other words as the lenses become thinner through the grinding process the recess permits the blocker to fit itself in closer conformity to the inner surface of the cup-shaped or depressed tools and at the same time does away with the danger of a distorted curve in the blank and the chipping and breaking of the edges which resulted when the old recessed tool, such as is shown in my copending application above identified, is used.

In forming the tools the concaved depression is first cut and then the bevel 10' is cut around the upper or outside edge of the depression. The recesses are next cut in the inner surface of the depressions. The bevel 10' is necessary in order that the blocker carrying the lenses may have the advantage of this extra cut to allow the blocker to to work its way down into the depression in the tool. When the lenses are first placed on the blocker and the grinding begins the diameter from the outside of the lens blanks on one side of the blocker to the outside of the lens blanks on the other side of the blocker is larger than the diameter of the depression in the tool.

It is thought that the manner in which the upwardly extending flange 14 on the lower tool forms the hopper for the abrading material will be readily apparent. The tools are preferably rotated in opposite directions through power supplied to the pulleys 6 and 7.

Having fully described my invention what I claim as new and desire to secure by Letters Patent is:

In combination with a blocker adapted for holding lenses to be ground, a grinding tool having a concaved depression therein and a recess centrally of the depression, a horizontal portion formed around the upper edge of the depression, and an annular flange surrounding the horizontal portion, the concaved depression being beveled at its upper edge, said beveled portion forming a continuation of the surface of the concaved depression to properly position the blocker within said depression over the central recess and to provide a passage from the horizontal portion.

In testimony whereof I affix my signature.

CHARLES A. ADAMS.